Oct. 13, 1931.  J. V. NELSON  1,826,948

CORN POPPER

Filed July 10, 1929

INVENTOR:
John Victor Nelson
By E. J. Andrews
Atty.

Patented Oct. 13, 1931

1,826,948

UNITED STATES PATENT OFFICE

JOHN VICTOR NELSON, OF ELMHURST, ILLINOIS, ASSIGNOR TO FRANZ K. KRAG, OF CHICAGO, ILLINOIS

CORN POPPER

Application filed July 10, 1929. Serial No. 377,169.

This invention relates to corn poppers and it has for its object providing a suitable corn popper to be heated by electricity. Another object of the invention is to provide suitable means for properly stirring the corn as it is being heated and for bringing the unpopped corn in position to receive the maximum amount of heat. Other objects of the invention will be apparent from a consideration of the accompanying drawings and the following description thereof.

Figure 1:
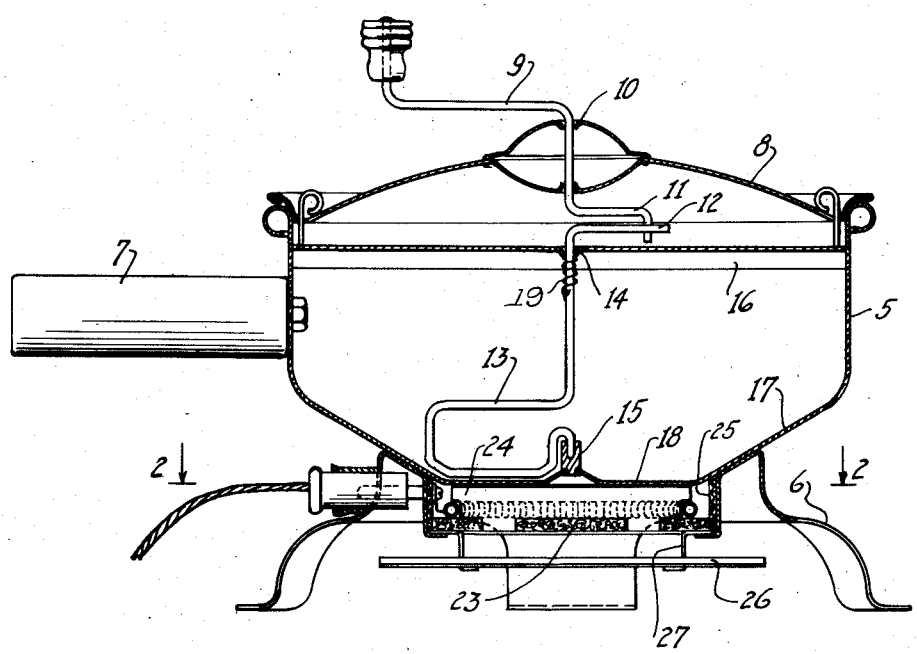
Figure 2:
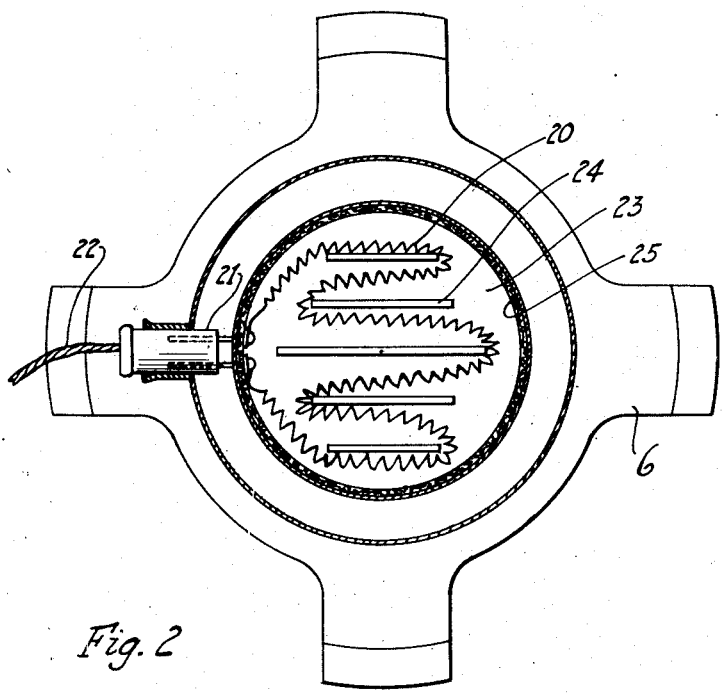

Of the drawings, Fig. 1 is a central sectional elevation of the corn popper; and Fig. 2 is a section along the line 2—2 of Fig. 1.

The popper comprises a vessel 5 supported by legs 6 and having a handle 7 and a cover 8. The cover is adapted to be entirely removed from the vessel 5. The stirring mechanism comprises a crank 9 which is mounted in bearings 10 in the cover. The crank has an arm 11 adapted to coact, without interlocking, with an arm 12 on the stirrer 13. The stirrer is mounted in bearings 14 and 15. The bearing 14 is mounted in a cross bar 16 in the upper part of the vessel and the bearing 15 is fixed to the bottom of the vessel. A spring 19 yieldingly holds the lower end of the stirrer down in the bearing 15.

When the corn is to be popped, it can be placed in the vessel 5 by simply lifting the cover and crank 9 from the vessel. The cover is then returned and the corn stirred as it is being heated. As the corn pops, it flies upwardly and the unheated corn passes down the sides 17 of the vessel to the bottom 18 which receives the maximum amount of heat.

The heating system comprises a heating coil 20 supplied with electricity by means of a plug 21 and a cord 22, the cord being connected, in an ordinary manner, with any suitable source of electric current. The coil is mounted on an asbestos plate 23 and held in position by means of flanges 24 projecting upwardly from the plate. Encircling the coil is a band 25 of asbestos or other suitable insulation and, as the flanges 24 extend substantially up to the bottom 18 of the vessel, the heat is substantially all transmitted to the vessel, waste being prevented by the various pieces of insulation. To limit the amount of heat which may escape downwardly through the insulation, a sheet 26 of insulation is provided, supported by lugs 27, between the heater and the support of the popper.

It will thus be seen that I have provided a corn popper which can be conveniently filled and emptied and, by means of which, the corn can be thoroughly stirred at all times without disturbing the popper itself. The popper is so arranged that the unpopped corn is continually working downwardly as the lighter popped corn moves upwardly and, thus, burning of the corn is prevented and uniform distribution of the heat is provided for. Also, the arrangement is such that substantially the entire amount of heat from the electric heater is transmitted to the corn. Inasmuch as the vessel is metallic and, hence, a good conductor of heat, the heat is conducted upwardly more or less along the side 17, so that the unpopped corn is gradually heated.

I claim as my invention:

1. A corn popper comprising a vessel, a bar extending across said vessel with its ends fixed to the sides of said vessel, a shaft journaled in said bar and extending downwardly with its lower end journaled in the bottom of said vessel, a loop in said shaft immediately above and extending along the bottom of said vessel, and means for rotating said shaft.

2. A corn popper as claimed in claim 1, including an angularly extending arm on the upper end of said shaft above said bar.

3. A corn popper as claimed in claim 1, including an angularly extending arm on the upper end of said shaft above said bar, and said vessel having a cover and rotatable means mounted on said cover for operating said shaft.

4. A corn popper as claimed in claim 1, including an angularly extending arm on the upper end of said shaft above said bar, and said vessel having a cover and rotatable means mounted on said cover for operating said shaft, said operating means comprising a second shaft journaled in said cover, said second shaft having an angularly extending arm below said cover arranged to coact with the arm of said vessel shaft.

5. A corn popper as claimed in claim 1, including an angularly extending arm on the upper end of said shaft above said bar, said vessel having a cover and rotatable means mounted on said cover for operating said shaft, said operating means comprising a second shaft journaled in said cover and having an arm projecting outwardly and downwardly from its inner end, and a portion of said arm extending lower than the arm of said vessel shaft.

6. A corn popper as claimed in claim 1, including yielding means tending to hold said shaft downward.

In testimony whereof, I hereunto set my hand.

JOHN VICTOR NELSON.